(12) United States Patent
Saito

(10) Patent No.: US 6,602,934 B1
(45) Date of Patent: Aug. 5, 2003

(54) MULTICOLOR COATING COMPOSITION, COATING FILM FORMING METHOD AND COATED ARTICLE

(75) Inventor: Yoshikatsu Saito, Kanagawa (JP)

(73) Assignee: Nippon Paint Co., Ltd., Osaka (JP)

( * ) Notice: Subject to any disclaimer, the term of this patent is extended or adjusted under 35 U.S.C. 154(b) by 67 days.

(21) Appl. No.: 09/621,429

(22) Filed: Jul. 21, 2000

(30) Foreign Application Priority Data

Jul. 21, 1999 (JP) .......................................... 11-206032

(51) Int. Cl.⁷ ................................................. C08K 9/00
(52) U.S. Cl. ...................... 523/216; 106/436; 106/439; 106/456; 106/459; 106/482; 523/210
(58) Field of Search ................................. 523/216, 210; 106/436, 439, 456, 459, 482

(56) References Cited

U.S. PATENT DOCUMENTS

| 5,480,480 A | | 1/1996 | Lynch et al. | |
| 5,759,257 A | * | 6/1998 | Ambrosius et al. | ......... 106/450 |

* cited by examiner

*Primary Examiner*—Edward J. Cain
(74) *Attorney, Agent, or Firm*—Jordan and Hamburg LLP

(57) ABSTRACT

This invention provides a multicolor coating composition comprising a vehicle and a metal oxide-coated silica flake pigment wherein a coating film resulting from baking of said coating composition and a coating film resulting from reheating of the former coating film under the same conditions as in said baking, followed by 10 minutes of standing at room temperature show a color difference of less than 0.5.

6 Claims, No Drawings

MULTICOLOR COATING COMPOSITION, COATING FILM FORMING METHOD AND COATED ARTICLE

FIELD OF THE INVENTION

The present invention relates to a multicolor coating composition containing a metal oxide-coated silica flake pigment specially treated for improved heat stability, to a coating film forming method and to an article obtainable by this method. The invention is preferably utilized in the field of coated articles where multicoloredness is required, such as outer panel of automobiles, bicycles and other vehicles, container exterior surfaces, coil coatings and household electrical appliances.

PRIOR ART

A coating composition capable of providing a coating film showing a plurality of different colors when observed from different angles and thus having multicoloredness with large color differences is disclosed in Japanese Kohyo Publication Hei-09-508172.

The interference platelets incorporated in the above coating composition according to Japanese Kohyo Publication Hei-09-508172 as a luster agent for attaining multicoloredness are a very effective material from the standpoint of achieving multicoloredness. However, this agent expresses very dynamic multicoloredness, in other words, the image obtained is too showy with great color differences noticed as the angle of view varies. Such showiness may cause some people to lose their presence of mind in certain instances. Therefore, it is desirable that the color differences be reduced to moderate levels to thereby realize more subdued or calm multicoloredness. Metal oxide-coated silica flake pigments have recently attracted attention as materials for realizing such calm multicoloredness. However, such metal oxide-coated silica flake pigments have a composition similar to hydrophilic silica pigments and the color cannot be said to have sufficient heat stability against moisture absorption and heating.

SUMMARY OF THE INVENTION

It is a primary object of the present invention to provide a multicolor coating composition capable of forming multicolor coating films with a good heat stability of color development in addition to the calm multicoloredness of those metal oxide-coated silica flake pigments which have so far been utilized.

Intensive investigations made by the present inventors to accomplish the above object have now led to completion of the present invention which comprises:

1. A multicolor coating composition comprising a vehicle and a metal oxide-coated silica flake pigment
wherein a coating film resulting from baking of said coating composition and a coating film resulting from reheating of the former coating film under the same conditions as in said baking, followed by 10 minutes of standing at room temperature, show a color difference of less than 0.5.
2. The multicolor coating composition as mentioned above comprising a luster pigment and/or color pigment other than the metal oxide-coated silica flake pigment.
3. A coating film forming method comprising forming a base coat layer by applying said multicolor coating composition to a substrate and then forming a top coat layer using a clear coating.
4. The coating film forming method as mentioned above, wherein the clear coating contains a carboxyl-containing polymer and an epoxy-containing polymer.
5. A coated article as obtainable by the above coating film forming method.

DETAILED DESCRIPTION OF THE INVENTION

In the following, the constitution of the present invention is described in detail.

The multicolor coating composition of the present invention capable of providing coating films with good heat stability contains a vehicle and a metal oxide-coated silica flake pigment, wherein a coating film resulting from baking of said coating composition and a coating film resulting from reheating of the former coating film under the same conditions as in said baking, followed by 10 minutes of standing at room temperature show a color difference of less than 0.5. The term "good heat stability" as used herein means that visual inspection does not reveal any substantial color change after the above reheating and 10 minutes of standing based on the color of the coating film before reheating under the coating film baking conditions. Specifically, the color change $\Delta E$ is 0 to 0.5. When the value of $\Delta E$ is in excess of 0.5, the coated article will take on different hues according to the temperature distribution of the substrate, hence color matching will be confounded in making spot repairs which accompany local heating. Preferably, the color change is 0 to 0.3. The above value $\Delta E$ is measured after a period of standing at room temperature, and ten minutes, which is sufficient for the temperature to fall to room temperature following heating, is taken as the standing period.

Vehicle

The vehicle contained in the multicolor coating composition of the present invention is a dispersion medium for a metal oxide-coated silica flake pigment, if necessary together with at least one pigment selected from among other luster pigments and color pigments, and/or the like and is constituted of a coating film-forming resin and, when necessary, a crosslinking agent.

The above coating film-forming resin, which constitutes the vehicle, includes, among others, (a) acrylic resins, (b) polyester resins, (c) alkydresins, (d) fluororesins, (e) epoxy resins, (f) polyurethane resins and (g) polyether resins. These may be used singly or two or more of them may be used combinedly. Particularly preferred are acrylic resins and polyester resins. The above coating film-forming resin may be of the curable type or of the lacquer type. Generally, curable type thermosetting resins are used, however. Curable type ones are generally used in admixture with a crosslinking agent, such as an amino resin, a (blocked) polyisocyanate compound, an amine, a polyamide or a polybasic carboxylic acid, and the curing reaction thereof can be allowed to proceed with heating or at ordinary temperature. It is also possible to combinedly use a noncurable lacquer type coating film-forming resin and a curable type one.

(a) Acrylic Resins

As the above acrylic resins, there may be mentioned copolymers of an acrylic monomer and another ethylenically unsaturated monomer. The acrylic monomer which can be used in this copolymerization include the methyl, ethyl, propyl, n-butyl, isobutyl, tert-butyl, 2-ethylhexyl, lauryl, phenyl, benzyl, 2-hydroxyethyl, 2-hydroxypropyl and like esters of acrylic acid or methacrylic acid, ring-opening adducts of caprolactone to 2-hydroxyethyl acrylate or methacrylate, glycidyl acrylate or methacrylate, acrylamide, methacrylamide and N-methylolacrylamide, among others. The other ethylenically unsaturated monomers copolymerizable with these include styrene, α-methylstyrene, itaconic acid, maleic acid, vinyl acetate and the like.

(b) Polyester Resins

As the above polyester resins, there may be mentioned saturated polyester resins and unsaturated polyester resins, among others, for example condensation products obtained by subjecting a polybasic acid and a polyhydric alcohol to condensation under heating. The polybasic acid includes, for example, saturated polybasic acids, unsaturated polybasic acids. The saturated polybasic acid include, among others, phthalic anhydride, terephthalic acid and succinic acid, while the unsaturated polybasic acids include, among others, maleic acid, maleic anhydride and fumaric acid. The polyhydric alcohol includes, for example, dihydric alcohols, such as ethylene glycol and diethylene glycol, and trihydric alcohols, such as glycerol, trimethylolpropane and the like.

(c) Alkyd Resins

Useful as the above alkyd resins are those alkyd resins produced by reacting together such a polybasic acid as mentioned above and such a polyhydric alcohol as mentioned above and, further, a modifier such as a fat or oil or a fat- or oil-derived fatty acid (e.g. soybean oil, linseed oil, coconut oil, stearic acid) or a natural resin (e.g. rosin, amber).

(d) Fluororesins

The above fluororesins include vinylidene fluoride resins, tetrafluoroethylene resins, mixture of these, and various fluorine-containing copolymer resins resulting from copolymerization of a fluoroolefin(s) and a hydroxy-containing polymerizable compound and some other copolymerizable vinyl compound(s).

(e) Epoxy Resins

The above epoxy resins include, among others, resins produced by reacting a bisphenol and epichlorohydrin. The bisphenol includes bisphenol A and bisphenol F, for instance. As such bisphenol-based epoxy resins, there may be mentioned, for example, "Epikote 828", "Epikote 1001", "Epikote 1004", "Epikote 1007" and "Epikote 1009" (all products of Shell Chemical). Those derived from these by chain extension using an appropriate chain extender agent may also be used.

(f) Polyurethane Resins

As the above polyurethane resins, there may be mentioned urethane bond-containing resins derived from at least one of various polyol components, such as acrylic, polyester, polyether or polycarbonate polyols, and at least one polyisocyanate compound. The polyisocyanate compound is, for example, 2,4-tolylene diisocyanate (2,4-TDI), 2,6-tolylene diisocyanate (2,6-TDI), a mixture of these (TDI), diphenylmethane-4,4'-diisocyanate (4,4'-MDI), diphenylmethane-2,4'-diisocyanate (2,4'-MDI), a mixture thereof (MDI), naphthalene-1,5-diisocyanate (NDI), 3,3'-dimethyl-4,4'-biphenylene diisocyanate (TODI), xylylene diisocyanate (XDI), dicyclohexylmethanediisocyanate (hydrogenated HDI), isophoronediisocyanate (IPDI), hexamethylene diisocyanate (HDI), hydrogenated xylylene diisocyanate (HXDI) or the like.

(g) Polyether Resins

As the above polyether resins, there may be mentioned ether bond-containing polymers or copolymers, such as polyoxyethylene polyethers, polyoxypropylene polyethers, polyoxybutylene polyethers, polyethers derived from an aromatic polyhydroxy compound such as bisphenol A or bisphenol F, like polyether resins having at least two hydroxy groups per molecule, and carboxyl-containing polyether resins obtained by reacting the polyether resins mentioned above with a polybasic carboxylic acid, such as succinic acid, adipic acid, sebacic acid, phthalic acid, isophthalic acid, terephthalic acid or trimellitic acid, or a reactive derivative thereof, such as the acid anhydride.

The multicolor coating composition of the present invention, when applied to an article having a curved surface, for example the outer surface of a container, can readily produce its multicolor effect. In cases where the coating composition is used as a clear coating to be applied to container outer surfaces, the vehicle to be used comprises a thermosetting coating film-forming resin selected from among the above-mentioned acrylic resins, polyester resins and epoxy resins, among others, and combinations of these, and a crosslinking agent selected form among melamine resins, benzoguanamine resins, urea resins and like resins, and combinations of these. As regards ultraviolet-curable type vehicles, use may be made of solvent-free or organic solvent-diluted, ultraviolet-induced radical curing type resin compositions derived from known materials, containing radical-polymerizable acrylate, methacrylate, allyl or like group, by incorporating therein an ultraviolet-induced radical polymerization initiator such as an aryl ketone, ultraviolet-induced cationic curing type resin compositions derived from known materials, containing cation-polymerizable cyclicether (e.g. epoxy, oxetane), vinyl ether or like group, by incorporating therein an ultraviolet-induced cationic polymerization initiator such as a sulfonium salt, and mixed resin compositions derived from these.

In cases where the above vehicle contains a crosslinking agent, the ratio between the coating film-forming resin and crosslinking agent on the solid basis is such that the coating film-forming resin accounts for 90 to 50% by weight and the crosslinking agent for 10 to 50% by weight, preferably such that the coating film-forming resin accounts for 85 to 60% by weight and the crosslinking agent for 15 to 40% by weight. When the crosslinking agent is used in an amount less than 10% by weight (or the coating film-forming resin is used in an amount exceeding 90% by weight), crosslinking in the coating film will be insufficient. Conversely, when the amount of the crosslinking agent is in excess of 50% by weight (or the amount of the coating film-forming resin is less than 50% by weight), the storage stability of the coating composition lowers and the rate of curing increases, which results in poor coating film appearance.

Metal Oxide-coated Silica Flake Pigment

The metal oxide-coated silica flake pigment to be used in the multicolor coating composition of the invention is composed of the base material flaky silica (silicon dioxide) coated with a metal oxide and treated for attaining heat stability. The base material thickness is preferably 300 to 500 nm, more preferably 400 to 450 nm, and the major axis is preferably 5 to 60 $\mu$m, more preferably 10 to 40 $\mu$m. The metal oxide used for coating is iron oxide (iron monoxide or diiron trioxide) or titanium dioxide. The coat layer thickness is preferably 50 to 120 nm, more preferably 60 to 120 nm.

The above base material silica is highly hygroscopic and the moisture absorbed evaporates upon heating. It is presumable that the interference color may vary depending on the presence or absence of moisture. Accordingly, the heat stability of the base material flaky silica can be improved by firmly coating it with such a metal oxide. Further, by using such metal oxide-coated silica flake pigment, the coating film formed can show calm multicoloredness.

The content of the above metal oxide-coated silica flake pigment in the multicolor coating composition of the invention (parts by weight of pigment solids per 100 parts by weight of coating solids; PWC) is preferably 0.01 to 30%. When it is less than 0.01%, coating films having multicoloredness can hardly be obtained. When it exceeds 30%, smooth coating films can hardly be obtained while those performance characteristics required of multicolor coating films cannot be obtained; the storage stability of the coating composition may be disturbed in some instances. For reducing the substrate-masking effect of the multicolor coating film and allowing color development in combination with the hue of the substrate, the above content is preferably 0.1 to 20% and, in the case of providing the multicolor coating film with the substrate-masking effect through combined use of a color pigment or the like, without color development combined with the hue of the substrate, it is preferably 0.5 to 30%. When the substrate is the container outer surface, it may be necessary for the multicolor coating film to have transparency so that a label mark, design or the like as formed with printing ink may be visible through the multicolor coating film and, in that case, the same amount of incorporation as in the case of causing color development combined with the hue of the substrate is preferred.

Other Luster Pigments

The above multicolor coating composition may contain, as a luster pigment other than the above metal oxide-coated silica flake pigment, any of the luster pigments conventionally used in coating compositions. As such, there may be mentioned, among others, aluminum flake pigments (leafing type, non-leafing type), colored aluminum flake pigments, mica pigments (titanium dioxide-coated mica, colored mica, metal-plated mica), graphite pigments, alumina flake pigments, metallic titanium flakes, stainless steel flakes, platelet-like iron oxide, phthalocyanine flakes and metal-plated glass flakes. The coating composition may contain the above other luster pigments at an arbitrary addition amount within the range within which the effect of the metal oxide-coated silica flake pigment will not be impaired.

Color Pigments

The above multicolor coating composition may contain a color pigment. As such, there may be mentioned those conventionally used in coatings, for example such organic pigments as azo lake pigments, phthalocyanine pigments, indigo pigments, perylene pigments, quinophthalone pigments, dioxazine pigments, quinacridone pigments, isoindolinone pigments and metal complex pigments and such inorganic pigments as chrome yellow, yellow iron oxide, red ion oxide, titanium dioxide and carbon black. The addition amount of the color pigment can be arbitrarily selected according to the desired hue unless it disturbs the effect of the metal oxide-coated silica flake pigment. Any of various extender pigments can also be used combinedly.

When the above metal oxide-coated silica flake pigment is used in combination with at least one pigment selected from among other luster pigments and color pigments, the weight-based mixing ratio [metal oxide-coated silica flake pigment/another luster pigment and/or color pigment] is preferably 99/1 to 40/60, more preferably 90/10 to 50/50. The luster pigment/color pigment mixing ratio by weight is preferably 99/1 to 1/99 and, within this range, a combination can be made to attain a desired hue. Where one or more of the above other luster pigments and color pigments are additionally used, the total content (PWC) of all the pigments used is preferably less than 50%, more preferably less than 30%. When it is in excess of 50%, the coating film appearance will become poor. Any of various extender pigments may also be used. As for the undercoat masking effect, the metal oxide-coated silica flake pigment within the range mentioned above and the other luster pigment species or color pigment species are adequately selected and the contents of the respective pigments are properly adjusted.

Other Components Than Those Mentioned Above

In the above multicolor coating composition, there may be incorporated, in addition to the above components, a polyamide wax, which is a lubricating dispersion of an aliphatic amide, a polyethylene wax, which is a colloidal dispersion mainly composed of oxidizedpolyethylene, an antisettling agent, a curing catalyst, an ultraviolet absorber, an antioxidant, a leveling agent, a surface modifier such as a silicone or an organic polymer, an antisagging agent, a thickening agent, an antifoam, a lubricant, a crosslinking polymer particles (microgel) and/or the like. By incorporating these additives in an amount of not more than 15 parts by weight per 100 parts by weight (on the solid basis) of the above vehicle, it is generally possible to improve the performance characteristics of the coating composition and/or coating film.

The above multicolor coating composition is provided generally in the form of a solution or dispersion prepared from the above components and a solvent. The solvent may be any one if capable of dissolving or dispersing the vehicle. Thus, an organic solvent and/or water can be used. The organic solvent includes those conventionally used in the field of coatings, for example hydrocarbons such as toluene and xylene, ketones such as acetone and methyl ethyl ketone, esters such as ethyl acetate, cellosolve acetate and butylcellosolve, and alcohols. Where the use of organic solvents is regulated from the environmental viewpoint, water is preferably used. In that case, the water may contain an appropriate amount of a hydrophilic organic solvent.

Coating Film Forming Method

The coating film forming method of the present invention comprises forming a multicolor coating film as a base coat layer by applying the above multicolor coating composition to a substrate and then forming at least one top coat layer by applying a clear coating onto the thus-obtained multicolor coating film.

The above substrate includes, but is not limited to, metals such as iron, aluminum, copper, and alloys thereof; inorganic materials such as glass, cement and concrete; plastic materials, inclusive of resins such as polyethylene resins, polypropylene resins, ethylene-vinyl acetate copolymer resins, polyamide resins, acrylic resins, vinylidene chloride resins, polycarbonate resins, polyurethane resins and epoxy resins, and various kinds of FRP; natural or synthetic materials such as wood, paper, cloths and other fibrous materials; and so forth.

Further, the above multicolor coating composition can be applied to cylindrical containers, such as containers for drinks, as well. The containers for drinks may be metal can containers made of aluminum, iron, tin-, chrome- or nickel-plated'steel, or the like or paper-made containers. The metal-made containers include two-piece cans formed by a cylindrical shell having a bottom, and a top cover, and three-piece cans formed by a cylindrical shell, a top cover and a bottom cover. There may further be mentioned decorative cans for food such as confectionery. The above two-piece cans, three-piece cans, paper containers and decorative cans may be provided, on the outer surface thereof, a label mark or design with a printing ink directly or after provision of a white base coat and, thereafter, further provided with a coating film using the multicolor coating composition of the invention for the purpose of developing multicoloredness and protecting the substrate from corrosion and further protecting the printed ink layer. Film-laminated metal cans can also be coated in the same manner.

In the above coating film forming method, the above multicolor coating composition is applied to the above substrate either directly or through the intermediary of an under coating film. When the article to be coated by the above coating film forming method is an outer panel of automobiles or automotive fitting or part or the like, it is preferred that the substrate be preliminarily subjected to chemical conversion treatment, primer coating by electrodeposition or the like, intermediate coating and so on. The intermediate coating application is carried out for providing substrate masking effects and chipping resistance, securing adhesion to the top coat and, where necessary, for producing a mixed color between the intermediate coating film and top coating film to thereby increase decorativeness when a transparent top coating film is applied. The intermediate coating film is formed by using a grayish intermediate coating or color intermediate coating.

In the above coating film forming method, the above multicolor coating composition is first applied to the above substrate to form a base coat layer. When the above substrate has been provided with an under coating film by means of an under coating and/or intermediate coating, for instance, the above multicolor coating composition may be applied onto the above under coating film by the wet-on-wet (W/W) or wet-on-dry (W/D) technique. The W/W technique comprises drying the under coating film following under coating application, and applying the multicolor coating composition in a state in which the under coating film remains uncured or half-cured, whereas the W/D technique comprises applying the multicolor coating composition to the under coating film after baking for curing thereof. In that case, by using a clear one as the above multicolor coating composition, it is possible to produce a color mixed with that of the under coating film.

While the method of applying the above multicolor coating composition to the substrate is not restricted, the spraying or roll coater method or the like is preferred. It is also possible to repeat a plurality of applications. The dry film thickness of the base coat layer resulting from application of the above multicolor coating composition is preferably 5 to 50 $\mu$m per coat. A thickness less than 5 $\mu$m may fail to produce calm multicoloredness to a satisfactory extent while a thickness exceeding 50 $\mu$m may lead to a deteriorated coating film appearance. A thickness of 10 to 30 $\mu$m is more preferred.

On the thus-formed base coat layer, there is then formed at least one clear coating film as a top coat layer. When the base coat layer contains a large amount of a luster pigment, the surface brightness can be improved by providing two or more clear coat layers.

The clear coating to be used in the above coating film forming method may be any of those generally used for top coating, for example mixtures of at least one thermosetting resin selected from among the above-mentioned acrylic resins, polyester resins, fluororesins, epoxy resins, polyurethane resins and polyether resins, and modified resins derived from these, among others, and the above-mentioned crosslinking agents. The use is preferred, however, of a clear coating comprising a carboxyl-containing polymer and an epoxy-containing polymer as described in Japanese Kokoku Publication Hei-08-19315 because it serves as a measure against acid rain and because the difference in solubility between the base coat layer and top coat layer can be increased in the step of application by the W/W technique, so that the luster pigment orientation in the base coat layer will not be disturbed. The clear coating mentioned above may further contain, when necessary, a color pigment, an extender pigment, a modifier, an ultraviolet absorber, a leveling agent, a dispersant, an antifoam and/or a like additive, each in an amount within the range within which the transparency of the composition will not be sacrificed.

While the application of the above clear coating may be carried out after simultaneous curing of the layers comprising the above base coat layer and, according to need, an intermediate coating under the base coat, it is preferable to apply the W/W technique mentioned above to the above base coat layer in an uncured or half-cured condition. In cases where a plurality of clear coating applications are repeated, the baking may be effected after the last clear coating application; complete curing is not necessary in the early clear coating application stage. The top coat layer thus formed using the clear coating by the W/W technique is baked, together with the base coat layer or the base coat and under coating films as the case may be, at 120 to 160° C. for an appropriate period, whereby the desired coating film can be obtained. The method of applying the above clear coating onto the base coat layer is not restricted. The above-mentioned spray or roll coater method or the like is preferred, however. The dry film thickness of the top coat layer is preferably 10 to 80 $\mu$m per coat. Outside this range, the coating film appearance may possibly be deteriorated. A thickness of 20 to 50 $\mu$m is more preferred.

Coated Article

The coated article obtained by applying the coating film forming method of the invention has a base coat layer formed on the substrate surface by using the above multicolor coating composition and a top coat layer formed thereon. In the case of container outer surface coatings, the outer surface is provided with a label mark or design with a printing ink either directly or after application of a, white base coat, and a top coating film is then formed thereon using a clear coating which has transparency and is prepared according to the formulation of the above multicolor coating composition but with a reduced pigment content. In the case of laminated cans, the coating films are formed on the film.

In the present invention wherein, the base coat film is formed from a coating containing said metal oxide-coated silica flake pigment which is conducive to a calm and attractive multicolor effect and has been stabilized against heat, the color change after baking under the coating film baking conditions, when expressed in terms of $\Delta E$, is 0 to 0.3 as compared with the color before the baking, so that the difference can hardly be noticed by the eye. Thus, the present invention can be applied to coating of a wide variety of articles.

The invention can also provide a multicolor coating composition and a coating film forming method, which can give such a coating film, as well as coated articles by that method. The coating film obtained according to the present invention has good heat stability, is excellent in calm multicoloredness and has a feel of quality, so that it is preferably used in articles requiring multicoloredness in such fields of industry as outer panel of automobiles, bicycles and the like, container outer surfaces, coil coatings and household electrical appliances, among others. The improvement in heat stability as attained according to the invention makes it possible to efficiently perform color matching operations in spot repair, for instance.

BEST MODE FOR CARRYING OUT THE INVENTION

The following examples and comparative examples illustrate the present invention in further detail. These examples are, however, by no means limitative of the scope of the invention. Unless otherwise specified, "part(s)" means "part (s) by weight".

EXAMPLES 1 TO 16 AND COMPARATIVE EXAMPLES 1 TO 4 SUBSTRATE PREPARATION

Dull steel sheets (300 mm long, 100 mm wide and 0.8 mm thick) were subjected to chemical conversion treatment using a phosphatizing agent ("Surfdyne SD 2000"; product of Nippon Paint) and then electrodeposition-coated with a cationic electrodeposition coating ("Powertop U-50"; product of Nippon Paint) to a dry film thickness of 25 μm. Then, following 30 minutes of baking at 160° C., an intermediate coating ("Orga S-90 Sealer Gray (N-6)", product of Nippon Paint) was applied by air spraying to a dry film thickness of 40 μm, followed by 30 minutes of baking at 140° C. to give substrates 1.

Separately, those substrates (substrates 2), obtained in the same manner as in preparing the above substrates 1 except that "Orga S-90 Sealer Gray (N-4)" (product of Nippon Paint) was used as the intermediate coating, were prepared as substrates for producing a mixed color between the under coat and top coat.

Preparation of Multicolor Coating Compositions

A vehicle prepared by admixing an acrylic resin (styrene/methyl methacrylate/ethyl methacrylate/hydroxyethyl methacrylate/methacrylic acid copolymer with a number average molecular weight of about 20,000, a hydroxyl value of 45, an acid value of 15 and a solid content of 50% by weight) and a melamine resin ("U-Van 20SE", product of Mitsui Chemical, solid content 60% by weight) in a solid weight ratio of 80:20 was blended with a metal oxide-coated silica flake pigment treated for stabilization against heat (silica flake A: diiron trioxide-coated silica flake pigment; silica flake B: titanium dioxide-coated silica flake pigment), a metal oxide-coated silica flake pigment untreated for stabilization against heat (silica flake C: diiron trioxide-coated silica flake pigment; silica flake D: titanium dioxide-coated silica flake pigment) and another luster pigment and/or color pigment in the proportions shown in Table 1. In Table 1, the amount of each component incorporated is shown in terms of parts by weight (on a solid basis) per 100 parts by weight of the resin solids. Multicolor coating compositions were then prepared by mixing, under stirring in a dissolver, each resulting mixture with an organic solvent (toluene/xylene/ethyl acetate/butyl acetate=70/15/10/5, by weight) until a viscosity adequate for application was attained. The other luster pigments used were an aluminum flake pigment ("Alumipaste MH8801", product of Asahi Chemical Industry), a colored aluminum flake pigment ("Fliend Color F 500 BL", product of Showa Alumipowder), a mica pigment ("Iriodin 502 WII", product of Merck), a graphite pigment ("Graphitan 7525", product of Ciba Specialty Chemicals), a finely divided titanium oxide pigment ("Tipaque TTO-55B", product of Ishihara Sangyo), an aluminum flake pigment A (iron trioxide-coated alumina flake pigment, product of Merck) and an alumina flake pigment B (titanium dioxide-coated alumina flake pigment, product of Merck).

Formation of Multicolor Coating Films

The above multicolor coating compositions were each applied to the surface of each substrate to dry film thickness of 15 μm. The application was carried out using an electrostatic spray coater (Auto REA, product of Rands burg-gema) at an atomizing pressure of 2.8 kg/cm². During application, the atmosphere in the booth was maintained at a temperature of 25° C. and a humidity of 75%. After 3 minutes of setting following application, a clear coating was applied to a dry film thickness of 35 μm and, following 10 minutes of setting at room temperature, baking was carried out at 140° C. for 30 minutes, to give a test specimen. The coating film obtained was evaluated for heat stability and multicoloredness by the methods mentioned below. The results are shown in Table 1. Two clear coatings were used; namely (1) anacrylic/melamine resin-based clear coating ("Superlac O-130 Clear", product of Nippon Paint) or (2) a clear coating comprising a blend of a carboxyl-containing polymer and an epoxy-containing polymer ("Macflow O-520 Clear", product of Nippon Paint) was used.

Evaluation Methods (Heat Stability)

Each test specimen after coating film formation was reheated at 140° C. for 30 minutes and then allowed to stand at room temperature for 10 minutes. This test specimen and the corresponding test specimen before reheating were measured for color difference using a colorimeter/color difference meter ("Minolta CR 300", product of Minolta) and the evaluation was made based on $\Delta E$, as follows:

3 . . . $0 \leq \Delta E \leq 0.3$

2 . . . $0.3 < \Delta E \leq 0.5$

1 . . . $0.5 < \Delta E$ (Multicoloredness)

The colors shown by the test specimen after coating film formation when it was observed almost vertically from above or looked down at an angle of 15° were evaluated by the eye, as follows:

⊚ . . . The color seen vertically from above and the color seen at an angle of 15° distinctly differ and show calm multicoloredness;

○ . . . The color seen vertically from above and the color seen at an angle of 15° differ;

X . . . The color seen vertically from above and the color seen at an angle of 15° cannot be said to be different.

TABLE 1

|  | Example | | | | | | | | | | | | | | | | Compar. Ex. | | | |
|---|---|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 1 | 2 | 3 | 4 |
| Substrate | 1 | 1 | 1 | 1 | 1 | 1 | 1 | 1 | 1 | 1 | 1 | 1 | 2 | 2 | 2 | 2 | 1 | 1 | 2 | 2 |
| Multicolor coating composition | | | | | | | | | | | | | | | | | | | | |
| Silica flake A | 10 | | 8 | 8 | 8 | 10 | 10 | 8 | 8 | 8 | | 8 | 5 | | 5 | | | | | |
| Silica flake B | | 10 | | | | | | | | | 10 | | | 5 | | 5 | | | | |
| Silica flake C | | | | | | | | | | | | | | | | | 10 | | 5 | |
| Silica flake D | | | | | | | | | | | | | | | | | | 10 | | 5 |
| Aluminum flake | | | 2 | | | | | | | 1 | | | | | | | | | | |
| Colored aluminum flake | | | | 2 | | | | | | | | | | | | | | | | |
| Mica | | | | | 3 | | | | | 1 | | | | | | | | | | |
| Graphite | | | | | | 2 | | | | | | | | | | | | | | |
| Alumina flake A | | | | | | | 2 | | | | | | | | | | | | | |
| Alumina flake B | | | | | | | | 2 | | | | | | | | | | | | |
| Finely divided titanium dioxide | | | | | | | | | 3 | | | | | | | | | | | |
| Phthalocyanine blue | | | 3 | 3 | 3 | 3 | 3 | 3 | 3 | 3 | | 3 | | | | | | | | |
| Carbon black | 3 | 3 | 3 | 3 | 3 | 1 | 3 | 3 | 3 | 3 | 3 | 3 | | | | | 3 | 3 | | |
| Clear coating species | (1) | (1) | (1) | (1) | (1) | (1) | (1) | (1) | (1) | (1) | (2) | (2) | (1) | (1) | (1) | (1) | (1) | (1) | (1) | (1) |
| Evaluation | | | | | | | | | | | | | | | | | | | | |
| Heat stability | 3 | 3 | 3 | 3 | 3 | 3 | 3 | 3 | 3 | 3 | 3 | 3 | 3 | 3 | 3 | 3 | 1 | 1 | 1 | 1 |
| Multicoloredness | ⊚ | ○ | ○ | ○ | ○ | ⊚ | ○ | ○ | ○ | ○ | ○ | ○ | ○ | ⊚ | ⊚ | ○ | ⊚ | ○ | ⊚ | ○ |

As is evident from Table 1, Examples 1 to 16 could give coating films having much higher heat stability and calm, excellent multicoloredness since the coating film formation was carried out using a coating composition containing a metal oxide-coated silica flake pigment treated for heat stabilization. In Examples 13 to 16, a mixed color between the clear base coat and the intermediate coat formed on the substrate was produced as result of formation of the base coat using a coating composition prepared by reducing the content of the metal oxide-coated silica flake pigment. In Comparative Examples 1 to 4, on the contrary, poor heat stability data were obtained since the coating film formation is carried out using the coating film metal oxide-coated silica flake pigment without treatment for heat stabilization.

What is claimed is:

1. A multicolor coating composition comprising a vehicle and a metal oxide-coated silica flake pigment, said metal oxide-coated silica flake pigment being coated with a metal oxide consisting essentially of at least one of iron oxide and titanium oxide, wherein an initial coating film resulting from baking of said coating composition and reheated coating film resulting from reheating of the initial coating film under the same conditions as in said baking, followed by 10 minutes of standing at room temperature, show a color difference of less than 0.5.

2. The multicolor coating composition according to claim 1 further comprising at least one of a luster pigment and color pigment other than the metal oxide-coated silica flake pigment.

3. A coating film forming method comprising forming a base coat layer by applying the multicolor coating composition according to claim 1 or 2 to a substrate and then forming a top coat layer using a clear coating.

4. The coating film forming method according to claim 3, wherein the clear coating contains a carboxyl-containing polymer and an epoxy-containing polymer.

5. A coated article as obtainable by the coating film forming method according to claim 3.

6. A coated article as obtained by the coating film forming method according to claim 4.

* * * * *